United States Patent
Sugaya

[11] 3,728,422
[45] Apr. 17, 1973

[54] METHOD OF MAKING AN IMAGE TRANSMITTING DEVICE

[75] Inventor: Fumio Sugaya, Kanagawa, Japan

[73] Assignee: Fuji Photo Film Co., Ltd., Kanagawa, Japan

[22] Filed: Dec. 17, 1971

[21] Appl. No.: 209,211

[30] Foreign Application Priority Data

Dec. 17, 1970 Japan..............................45/113925

[52] U.S. Cl. ......................264/1, 264/134, 264/293, 156/220
[51] Int. Cl. ..............................................B29d 11/00
[58] Field of Search........................264/1, 134, 284, 264/293; 156/220

[56] References Cited

UNITED STATES PATENTS

| | | |
|---|---|---|
| 3,498,864 | 3/1970 | Ogle.....................264/1 X |
| 2,621,139 | 12/1952 | Messing.................156/220 X |
| 3,542,453 | 11/1970 | Kantor...................264/1 X |
| 3,542,451 | 11/1970 | Washburn................264/1 X |

*Primary Examiner*—Robert F. White
*Assistant Examiner*—Allen M. Sokal
*Attorney*—Richard C. Sughrue et al.

[57] ABSTRACT

A method of forming an image transmitting device by forming a sandwich structure comprising a center of a first film having a high refractive index and a low melting point sandwiched between two second films having a low refractive index and a medium melting point, the center being sandwiched between two third films having a high melting point. The sandwich structure is heated and pressed in a grooved mold such that the first film forms columns surrounded by the second film. The pressed sandwich structures may then be stacked and cut.

4 Claims, 9 Drawing Figures

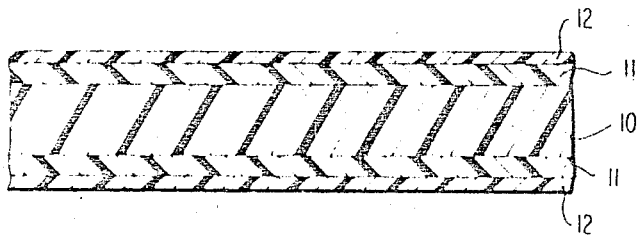
FIG. 1
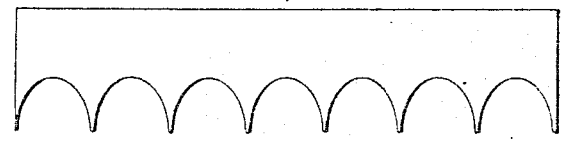
FIG. 2
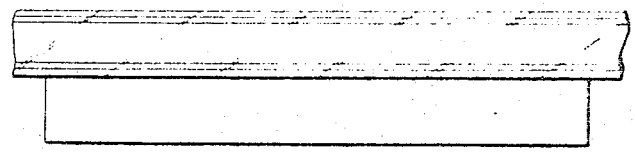
FIG. 3
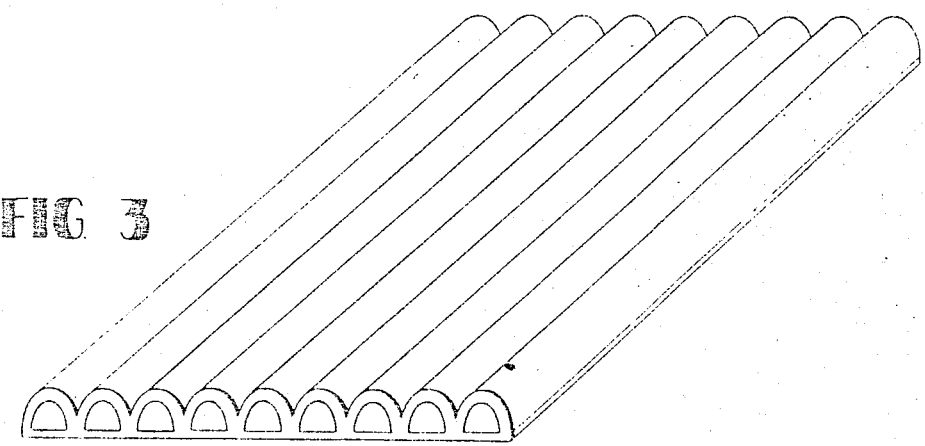
FIG. 4
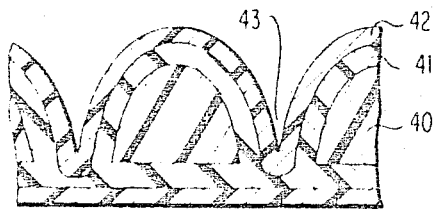
FIG. 5

METHOD OF MAKING AN IMAGE TRANSMITTING DEVICE

BACKGROUND OF THE INVENTION

1. Field of the Invention

This invention relates to a method of making an image transmitting device, in particular, formed of horizontally arranged image transmitting elements using a plastic film.

2. Description of the Prior Art

Optical glass fibers are generally used as image transmitting devices. These optical fibers, each being one fiber, must one by one be aligned and assembled in order to transmit an image. Various attempts have been made to overcome the problems involved when a large number of small and flexible light conducting fibers are assembled to transmit an image. For example, a fiber bundle is aligned by applying a vibratory motion (U.S. Pat. No. 2,992,956), or fibers are aligned, wound round a drum, fixed partly by adhesives and then cut (U.S. Pat. No. 3,104,191), or fibers are piled between several standing pins and guides (Japanese Patent Publication No. 11, 396/70 and 12,838/70). By these methods, however, as the fibers are aligned, one by one, much time is consumed and it is impossible to align fibers in the form of a fan rather than in parallel.

It has also been proposed to make a light conducting sheet arranged horizontally by means of a mold having a number of grooves, rather than aligning fibers one by one (U.S. Pat. No. 3,498,864). By this method, however, it is difficult to provide an excellent reflecting surface, because the form of the reflecting surface when light passes through the light conducting sheet is determined by the form of a press and, furthermore, it is difficult to make the grooves small, thereby requiring precision work on the plane property of the mold.

It has also been proposed to fill a film formed like a peplum with a light conducting substance (Japanese Patent Publication No. 12, 116/70). This method, however, has a disadvantage in that it is difficult to provide an excellent reflecting surface, because the surface of the film is determined by the shape of the surface of a press, and it is difficult to make a good reflecting surface and fill a film with a light conducting substance having thin folds on the surface thereof in the order of 1 to 100 microns.

SUMMARY OF THE INVENTION

It is the principal object of this invention to provide a method of making a horizontally arranged light conducting sheet by use of a press, which has an excellent reflecting surface independent of the surface of a press mold.

Another object of the invention is to simultaneously form a core or column of a light conducting substance having a high refractive index and a sheath having a low refractive index.

A further object of the invention is to make it possible to provide a thin sheath of several microns.

In the method of the invention, both sides of a transparent plastic film, which is a light conducting substance having a high refractive index and low melting point, are coated or laminated with a film which is to be a sheath. This sheath film is a transparent film having a low refractive index and medium melting point. Moreover, high melting point films are coated or laminated onto the sheath films. The resulting film, consisting of the five layers, is pressed by means of a mold having a number of grooves arranged horizontally. Heat is applied such that the medium melting point film, which is to be the sheath, is heat sealed. In the pressed film, the parts corresponding to the grooves of the press are such that the light conducting substance is enclosed by the sheath.

A light conducting device can be assembled by stacking the image transmitting sheets made by the above method.

BRIEF DESCRIPTION OF THE DRAWING

The method based on the invention will now be illustrated by the accompanying drawings in which:

FIG. 1 is a cross-sectional view of a multi-layer plastic film prior to pressing;

FIG. 2 is a cross-sectional view of a multi-layer plastic film prior to pressing and a mold for press working;

FIG. 3 is a perspective view of a multi-layer film which has been pressed;

FIG. 4 is an enlarged transverse cross-sectional view of a multi-layer plastic film which has been pressed;

FIG. 5 is a view similar to FIG. 4;

DESCRIPTION OF THE PREFERRED EMBODIMENT

Figure 6:
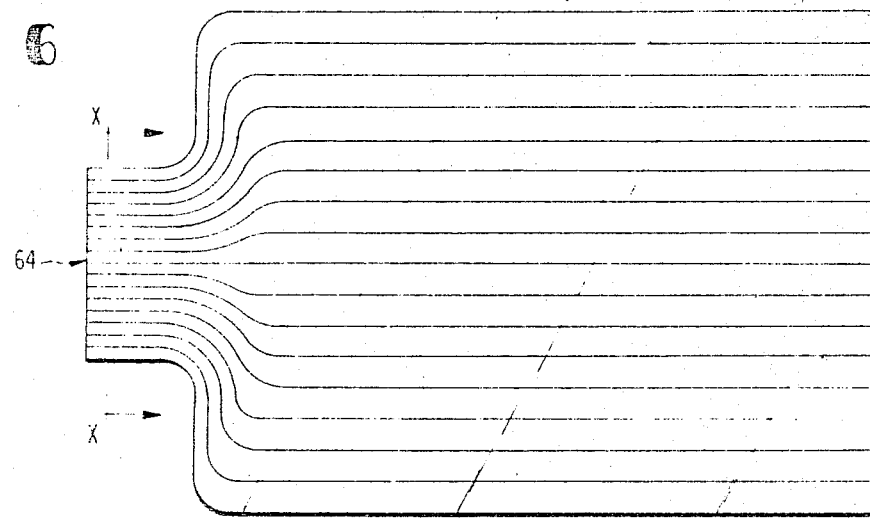
FIG. 6 is a plan view of a film which has been pressed.

FIG. 1 shows the structure of a film prior to pressing wherein image transmitting part 10 is made, for example, of polystyrol. Polystyrol has a visible ray transmittivity of 90 percent or more, a refractive index of 1.60 and a thermal deformation temperature of 78° – 110°C. In FIG. 1, sheath part 11 may be made of diacetate having a visible ray transmittivity of 90 percent or more, a refractive index of 1.49 and a melting point of 220°C. Exterior layer 12 may be of triacetate having a visible ray transmittivity of 90 percent or more, a refractive index of 1.48 and a melting point of 290°C. This layer may preferably contain or be coated with a light absorbing substance so that there is no coupling of light between this layer and an adjacent layer. For example, polystyrol of 100 microns and diacetate and triacetate films of 12 microns are used. Furthermore, a thin film or coating may be used.

The film of such structure is pressed as shown in FIG. 2 at a temperature of about 200°C. and a pressure of 500 g or more per heat seal surface (mm²). The mold for pressing has one side which is flat and the other side which is grooved. The groove is made by engraving or by stacking an aluminum film of 200 microns and steel film of 10 microns, for example, and after polishing, subjecting to chemical milling with alkali to dissolve the aluminum.

Pressing the film produces a light conducting sheet as shown in FIG. 3. An enlarged cross-section is shown in FIG. 4. The thickness of outside triacetate film 42 has not changed, and the inside diacetate film 41 is heat sealed to envelop a column of polystyrol 40 which is turned to a liquid by heat during the pressing.

The boundary surface of the image transmitting substance consisting of polystyrol 40 and the sheath consisting of diacetate 41 is a good surface which is not directly affected by the surface of a press mold. Due to the presence of triacetate 42, the light conducting sheet is strengthened such that valley part 43 is not cut, even if the plane property of a mold is bad. This gives an advantage in the subsequent assembling of the image transmitting sheets.

The light conducting sheets of FIG. 3 may be stacked to give an image transmitting device or may be stacked after being passed through rollers having a constant gap to give square cross sections as shown in FIG. 5, thus obtaining a device with high precision and little loss of light quantity.

Figure 7:
FIG. 7 is an enlarged fragmentary cross-sectional view of FIG. 6 along 7—7.
Figure 8:
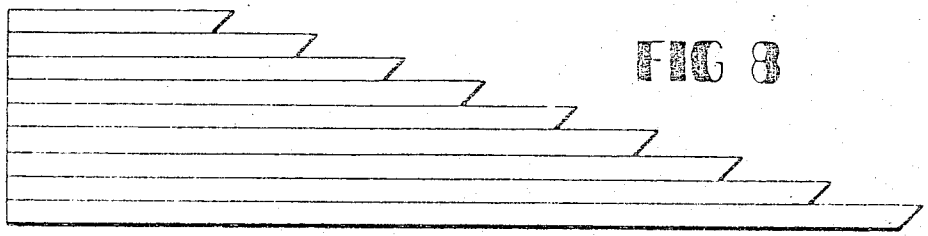
FIG. 8 is a side view of a light image enlarging device obtained by stacking the films of FIG. 6.

An image transmitting device using an image transmitting sheet made by the above method, that is, an image enlarging device, will hereinafter be illustrated. Firstly, an image transmitting sheet as shown is made with an input end 64 in which the image transmitting substances are disposed with a narrow pitch. This is shown at cross-section X—X' in FIG. 6. At output end 65 the light conducting substances are disposed with a large pitch, as shown at cross-section 7—7 in FIG. 7. The image transmitting sheets are cut vertically with respect to the image transmitting substances while varying the distance from the input end. The cut surface and image transmitting surface make an angle of about 45°. The thus cut image transmitting sheets are adhered to each other and stacked, as shown in FIG. 8. The assembled image transmitting device can enlarge at viewing end 95 an image at input end 94.

Figure 9:
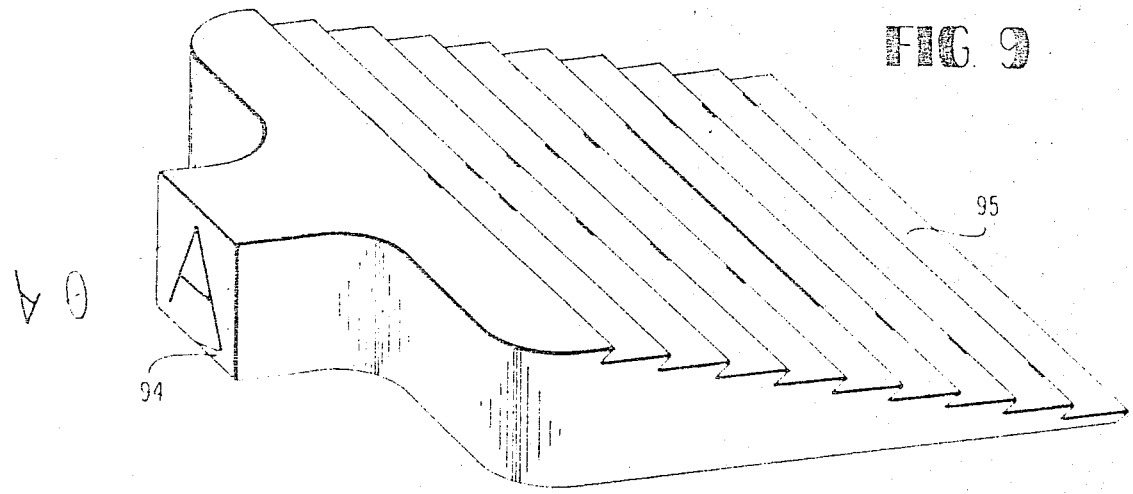
FIG. 9 is a perspective view showing the operation of the light image enlarging device.

FIG. 9 is a perspective view of a stacked transmitting device.

It will be understood from the foregoing that according to the method of the invention, an image-transmitting sheet wherein a number of image transmitting substances and sheaths, horizontally disposed, can be made by means of a press mold which does not have a high precision surface.

While the invention has been particularly shown and described with reference to the preferred embodiments thereof, it will be understood by those skilled in the art that various changes in form and details may be made therein without departing from the spirit and scope of the invention.

I claim:

1. A method of making an image transmitting device comprising:
   a. taking a first film of transparent plastic having a high refractive index and a low melting point and coating both sides of said first film with a second film of transparent material having a low refractive index and a medium melting point;
   b. coating the exposed surfaces of said second film with a third film having a high melting point wherein a sandwich structure is formed having a center comprising said first film sandwiched between said second film, and an exterior comprising said third film sandwiching said center;
   c. heating said sandwich structure; and
   d. pressing said sandwich structure in a mold having a plurality of grooves, thereby forming columns of said first film surrounded by said second film.

2. The method of claim 1 further comprising:
   a. stacking a plurality of said pressed sandwich structures; and
   b. forming a narrow pitch at one end of the stacked structure.

3. The method of claim 2 further comprising cutting each of said sandwich structures at a different length.

4. The method of claim 3 wherein each sandwich structure is cut at an angle of 45°.

* * * * *